(12) United States Patent
Bird et al.

(10) Patent No.: US 12,326,720 B2
(45) Date of Patent: Jun. 10, 2025

(54) INDUSTRIAL WIRELESS SYSTEMS WITH LOW POWER WIRELESS SENSORS

(71) Applicant: PHILLIPS 66 COMPANY, Houston, TX (US)

(72) Inventors: Paul L. Bird, Granite City, IL (US); Shahid Bashir, Katy, TX (US); John W. Gusewelle, Dorsey, IL (US); Scott M. Gallagher, Fulshear, TX (US); Brendan R. Keuss, Westlake, LA (US)

(73) Assignee: Phillips 66 Company, Houston, TX (US)

( * ) Notice: Subject to any disclaimer, the term of this patent is extended or adjusted under 35 U.S.C. 154(b) by 652 days.

(21) Appl. No.: 17/748,390

(22) Filed: May 19, 2022

(65) Prior Publication Data

US 2022/0382256 A1 Dec. 1, 2022

Related U.S. Application Data

(60) Provisional application No. 63/194,709, filed on May 28, 2021, provisional application No. 63/194,642, filed on May 28, 2021, provisional application No. 63/194,676, filed on May 28, 2021.

(51) Int. Cl.
| | | |
|---|---|---|
| H04B 17/318 | (2015.01) | |
| G05B 19/418 | (2006.01) | |
| H04B 13/02 | (2006.01) | |
| H04W 4/38 | (2018.01) | |
| H04W 72/04 | (2023.01) | |
| H04W 72/0453 | (2023.01) | |

(52) U.S. Cl.
CPC ..... *G05B 19/4185* (2013.01); *G05B 19/4183* (2013.01); *G05B 19/4188* (2013.01); *H04B 17/318* (2015.01); *H04W 4/38* (2018.02); *H04W 72/0453* (2013.01)

(58) Field of Classification Search
None
See application file for complete search history.

(56) References Cited

U.S. PATENT DOCUMENTS

| | | | | |
|---|---|---|---|---|
| 7,801,079 | B2 * | 9/2010 | Saidi | G01D 21/00 370/347 |
| 10,476,605 | B2 * | 11/2019 | Ko | H04W 72/51 |
| 11,099,539 | B2 * | 8/2021 | Fuhr | G05B 19/0423 |
| 12,132,822 | B2 * | 10/2024 | Finster | G06F 21/64 |
| 2015/0003422 | A1 * | 1/2015 | Jin | H04L 5/026 370/335 |

* cited by examiner

*Primary Examiner* — Pablo N Tran
(74) *Attorney, Agent, or Firm* — Phillips 66 Company

(57) ABSTRACT

Data acquired by numerous wireless sensors in a large industrial setting is communicated to the operations center via nodes in defined geographic cells where the signals from the sensors may be depowered to naturally attenuate below the perception of most other receiving nodes in the industrial system. It would be optimal that signals would attenuate sufficiently such that most signals in a cell are not discernible to receiving nodes in adjacent cells, but some sensors near the boundary of a cell will probably have to be set at sufficient power that the nearest adjacent receiving cell would necessarily perceive the signal. Data rejection protocols would exclude data from outside a cell and the advantage of the invention is that it minimizes the volume of errant signals leading to more reliable and robust data for operators.

9 Claims, 3 Drawing Sheets

INDUSTRIAL WIRELESS SYSTEMS WITH LOW POWER WIRELESS SENSORS

CROSS-REFERENCE TO RELATED APPLICATIONS

This application is a non-provisional application which claims the benefit of and priority to U.S. Provisional Application Ser. No. 63/194,642 (entitled Industrial Wireless Systems with Channel Selection), U.S. Provisional Application Ser. No. 63/194,676 (entitled Industrial Wireless Systems with Low Power Wireless Sensors), and U.S. Provisional Application Ser. No. 63/194,709 (entitled Industrial Controls with a Combination of Wireless and Direct Connection), all of which were filed on May 28, 2021 and are hereby incorporated by reference their entirety.

STATEMENT REGARDING FEDERALLY SPONSORED RESEARCH OR DEVELOPMENT

None.

FIELD OF THE INVENTION

This invention relates to the management and control of an industrial facility such as a refinery comprising numerous systems dispersed across a large area where operators need an array of data and the ability to adjust and control each system remotely for safe, reliable, effective and efficient operation of the industrial facility.

BACKGROUND OF THE INVENTION

The safe, effective, and efficient operation of a crude oil refinery requires continual data regarding ongoing processes and current conditions at thousands of locations spread across a large facility typically occupying many, many acres. Relevant information (data) relates to temperatures, pressures, flow rates, ambient conditions, and even information related to vibrations and acoustics that could give advanced indications for the need for maintenance on pumps and other equipment or an anomaly in current operation. However, installing wires and cables throughout a refinery to connect each sensor to an operations center could require a huge investment. As new sensor capabilities and detection paradigms are developed, adding new wiring might be many times more costly than the sensors, themselves. Wireless sensors and wireless communications for sensors has greatly reduced the cost for new sensor deployments, but wireless communications can become unreliable and discordant when overloaded with continually increasing number of signals and networks. It is akin to listening for an individual voice within a very loud and crowded venue.

It is very important that all information is communicated, gathered, organized, prioritized, and coherently delivered to operators or automatic control systems for the refinery management. And with ever more data needs and ever more developments in new sensor capabilities that are yet to be created, refinery systems must be structured to handle future developments as well as improve current performance capabilities.

Refinery operators, being humans, have limited capability for input and really need relevant information in a timely and highly reliable manner. So, communication systems for gathering operational information are designed for timely and reliable service. Similarly, operator actions and inputs that must be taken in a real-time are communicated to actuators in the refinery in a timely, reliable and accurate manner to ensure reliable and safe operation. These two operations-centric communication systems must be designed and operated with double certainty for reliability and fail-safe operations.

In addition to the critical operating data, a secondary set of data is also desirably gathered that is focused on refinery maintenance and competitive advantage. This secondary information may be used with artificial intelligence or machine learning to provide companies with further competitive advantage in safety enhancement by predicting equipment failures and catalyst life, providing maintenance cost savings and risk-based planning. This secondary set of data is less time critical compared to operations data in an industrial environment but may comprise a larger array and a vast quantity of information. Currently, data gathering systems of this secondary type are severely limited by cost implications and conflicts with existing data communication channels that are likely to create adverse impacts on operations.

Improvements and improved techniques for reliably and cost effectively gathering both operational and secondary electronic data from across a large industrial setting would be very beneficial.

BRIEF SUMMARY OF THE DISCLOSURE

The present embodiment relates to a process for communicating data within an industrial setting where numerous measurements are helpful for safe and efficient operations where sensors are dispersed to make measurements and provide readings of those measurements to multiple locations including a central operations location and a secondary data center, where the process includes installing at least two groups of wireless sensors where sensors are positioned at various distributed locations across the industrial setting, where each group of sensors has different priority and a first group of wireless sensors is assigned a first specific set of frequency channels for wireless communication and a second group of wireless sensors is assigned a second set of frequency channels for wireless communication where each sensor has an adjustable transmit power setting. A corresponding number of groups of node communicators is installed in a disperse arrangement around the industrial setting where a first group of node communicators is arranged to communicate with the first group of sensors assigned to a first specific frequency channel and a second group of node communicators is arranged to communicate with a second group of sensors assigned to a second specific frequency channel where the groups of node communicators are arranged in a sufficient density or proximity to the various sensors to communicate at a power level that communicates data without significantly impacting another group of sensors and the power for each sensors is set at a maximum signal strength so as to minimize interference with other sensor wireless communication.

BRIEF DESCRIPTION OF THE DRAWINGS

A more complete understanding of the present invention and benefits thereof may be acquired by referring to the follow description taken in conjunction with the accompanying drawings in which.

DETAILED DESCRIPTION

Turning now to the detailed description of the preferred arrangement or arrangements of the present invention, it should be understood that the inventive features and concepts may be manifested in other arrangements and that the scope of the invention is not limited to the embodiments described or illustrated. The scope of the invention is intended only to be limited by the scope of the claims that follow.

Figure 1:
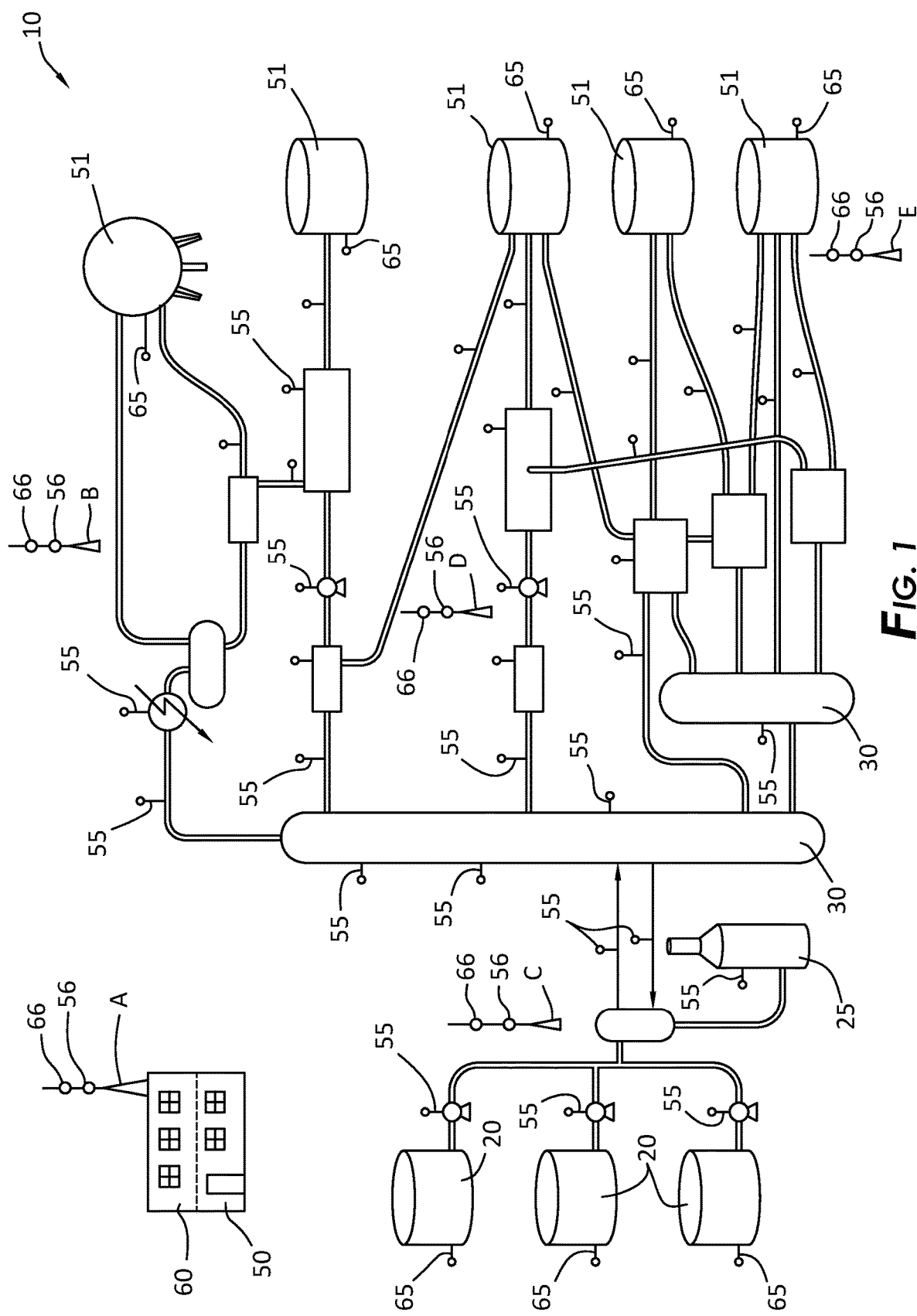
FIG. 1 is a diagram of an example refinery facility showing a great plurality of sensors arrayed across the refinery facility communicating with an operations center at which operators run the refinery facility.

Turning now to FIG. 1, there is shown a representative refinery facility 10 that includes the basic elements of most refineries such as crude oil storage tanks 20, conduit pipes and pumps, a furnace 25, heaters and heat exchangers, separation towers 30 and various processing and separating systems that physically or chemically alter hydrocarbon materials or separates hydrocarbons into advantaged compositions and finally storage tanks 51 for finished products.

The present invention is not, per se related to refining but it is suited for use in any large and complex industrial system. As can be seen from FIG. 1, a refinery facility is quite complicated and is useful for explaining the invention. A central operation center 50 accommodates human operators where data is gathered from around the facility 10 and in which operational decisions are made based on relevant data and other planning goals. A secondary data center 60 is shown on the second floor of the same building but is more often located separately from the operations center. The operators in the operations center 50 control the operation of the many systems and pieces of equipment within the facility 10. Many systems are hardwired to the operations, but some data used by the operators may, according to the present invention be provided wirelessly from sensors out in the refinery.

The operations center 50 controls the continuous operation of the refinery. There are many decisions made in the operations center and engineering group that are based on analysis created in the secondary data center 60. The secondary data center 60 is typically staffed by engineers and strategists that assess market conditions and various performance metrics of systems within the refinery 10. Staff in the secondary data center can use data and models to consider new target temperatures, pressures and flow rates that would provide the best financial performance for the refinery. The resulting guidance is passed to the operation center that will then adjust settings and monitor performance of the various systems while maintaining everything in a safe, steady and reliable condition. Other guidance may come from the secondary data center which analyzes the longer-term system performance seeking to manage performance of catalyst-based systems where the age of catalyst impacts the productivity of certain reactors. Decisions are made in the secondary data center 60 for online maintenance, risk-based inspections, taking portions of the refinery offline for maintenance and making modifications to the refinery during a shutdown. As such, the data for the secondary data center 60 is not time critical in the sense that seconds count but can be quite voluminous compared to the data needed for the operations center 50.

The facility 10 is shown with wireless operations sensors 55 at many locations within the refinery and the FIG. 1 shows a fraction of the full number of sensors in typical use in a conventional refinery. While most sensors and most remote operations communication infrastructure is hardwired in many refineries for security and for reliability, many hundreds can be arranged to operate wirelessly with long lasting battery power. A battery powered sensor is typically inexpensive and may be installed very inexpensively without running a dedicated wire back to the operations center 50.

Figure 2:
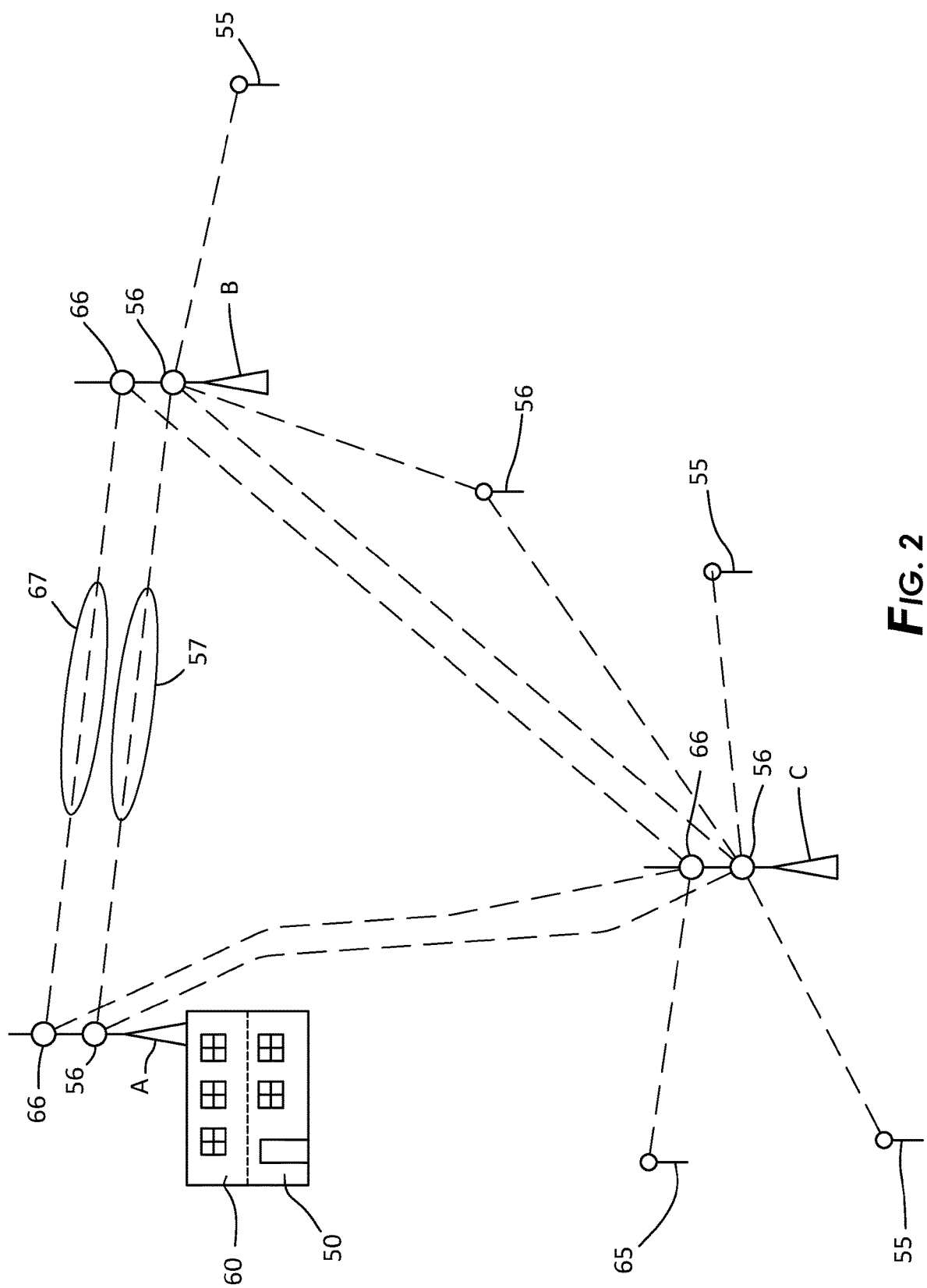
FIG. 2 is a diagram of the wireless communication system using at least two sets of node communicators dispersed around the refinery for receiving signals from at least two different types of sensors that are also arrayed around the refinery where the node communicators gather and forward data on to an operations center and to other data centers for analysis.

In a feature of the present invention, the secondary data is gathered using a different wireless communication system including secondary wireless sensors 65 at many locations. Wireless communication is preferable (but not mandatory) when adding new sensors to save wiring cost. Furthermore, these secondary wireless sensors 65 are configured to minimize any undesirable interference with wireless operations sensors 55. In accordance with the present invention, the wireless operations sensors 55 and secondary wireless sensors 65 within the refinery are divided into geographical cells or configured in a mesh to reduce the distance by which each wireless sensor communicates data. At the center of each geographic cell or node on the mesh are preferably two node communicators. The first is the operations node communicator 56 arranged to be in two-way communication with the wireless operations sensors 55 such that there is an optimally convenient operations node communicator in easy range for each wireless operations sensors 55. The second is the secondary (data) node communicator 66. Preferably, the two node communicators 56 and 66 are stationed at an elevated location such as a tower, a pole or other stanchion. In a more preferred arrangement, the two node communicators 56 and 66 are positioned on the same support structure and vertically separated thereon at that same geographic location as shown in FIGS. 1 and 2. These node communicators 56 and 66 are shown at various locations in FIG. 1 indicated by the letters A, B, C, D, and E and also in FIG. 2. As shown in the figures, two-way communication between node communicators can optionally take place via hardwire communication rather than wireless communication. For example in FIG. 2 (discussed in further detail below), A could be hardwired to B, whereas B could be wirelessly connected to C and likewise A could be wirelessly connected to C. Likewise, in FIG. 3 (discussed in further detail below), A could be hardwired to B, whereas B could be wirelessly connected to C. Alternatively, in FIG. 3, A could be wirelessly connected to B, whereas B could be hardwired to C. Any number of combinations of wireless and wired communication can be used, especially where multiple node communicators are incorporated.

Turning to FIG. 2, in this non-limiting embodiment, each of the operations node communicators 56 are configured to receive data from each of the sensors 55 on a first predefined frequency channels set. Similarly, each of the secondary node communicators 66 are configured to receive data from the secondary sensors 65 on a second predefined frequency channels set differently from the first frequency channel set. It should be understood that each of the first and second frequency channels sets may be a set of frequency channels as long as the first set is distinct from the second set or has a partial overlap. A set of frequency channels can have one or more frequency channels assigned to it.

Considering that frequency spectrum is often limited, some sensors supplying data may operate on frequency channel sets that may partially or substantially overlap with other data when interference is tolerable depending on the nature of the data and sensors. Where data update rates or refresh rates are high and the data is operation critical, the relevant operations sensors 55 should have more frequency separation from the secondary sensors 65 to minimize interference.

As the data from the sensors 55 and 65 are gathered by the node communicators 56 and 66, a backhaul communication system is provided to bring that data from each node sensor to the respective operations center 50 and secondary data center 60, directly or through additional intermediate node communicators 56 and 66. The backhaul systems may be hardwired or wireless, or they may contain elements or sections of hardwired and wireless communication lengths or "hops."

In one embodiment, the backhaul systems are organized such that the data is communicated via two additional sets of frequency channels, third and fourth sets, that are quite distinctive from the two frequencies of the node gathering systems. It is known that a more substantial difference in frequency between two systems reduces interference between those systems. For a battery operated (e.g. low power) sensor, its signals could be easily lost amongst the high power backhaul signals if not for substantial frequency separation. And again, the backhaul systems are preferred to use sets of frequency channels and not just a single channel. A set of frequency channels can have one or more frequency channels assigned to it. The backhaul communication are shown in FIG. 2 as 57 and 67 but may include node communicators in between the operations center 50 and secondary data center 60 that pass along data collected more remotely from the node communicator located at the tower A.

As such, a third set of frequency channels is selected for communication 57 among operations data node communicators 56 and the central operations center 50. Similarly, a fourth set of frequency channels is selected for communication 67 between and among secondary data node communicators 66 and also with the secondary data center 60. It should be understood that the third and fourth frequencies may be sets of frequencies and that the nodes do communicate amongst themselves including for conveying data from distant geographical cells to the respective center 50 or 60. The third and fourth frequency channels may be selected as adjacent frequencies to each other. For the operations node communicators 56, it is preferred to select a more reliable and cleaner channel or channels on which to carry the operation critical data between node communicators 56.

In addition to selecting and configuring the four sets of frequency channel sets, it is important for reliable operation that no other communications exists on sets of frequency channels in the area that can impact data gathering communication between sensor 55, 65 and node communicators 56 and 66. Similarly, no other communication exists on sets of frequency channels in the area that can impact backhaul communication among node communicators 56 and among node communicators 66.

Most of the data from each wireless sensor is gathered and forwarded by the respective node communicator on an intermittent basis and not continuously. The expected data includes temperatures, pressures, flow rates, fluid levels, noise volumes at select decibel ranges in select locations depending on equipment and anticipated failure noise signatures and all of this data may be reported periodically.

Operations data for operations center 50 may be reported at high regularity or high data update rate or refresh rate such as every second, or every few seconds and even up to every minute or so, and data for secondary data center 60 is more likely gathered and reported in 15 minute intervals, hourly or daily or some periodicity in between. The key for good order is to minimize interference by using a power setting that gets intelligible signal to a nearby node communicator but not so powerful to be received by more than a few node communicators. It has been logical to most to turn up the power on any communications device that is faced with interfering noise. But a lot can be gained by turning down the power and thereby the noise from most sources. Simply stated, lower power signals break out less across adjacent frequencies than higher power signals. And it is this excursion to adjacent spectrum that adds to the complexity of gathering all desired relevant data. It also helps to also time those communications to avoid noise from high power transmissions from the backhaul communications systems. The present invention relates to the management of noise for reliable communication of low power sensors 55, 65 to node communicators 56 and 66.

In the present invention, that management is accomplished by selecting the transmission power to lowest practical levels. The node communicators have different power characteristics compared to sensors. In the present invention, the two types of power management are addressed separately.

The node communicators 56 and 66 are capable of much higher power signal transmissions compared to the wireless sensors 55 and 65. Specifically, secondary node communicators 66 can interfere with wireless sensors 55 in their effort to reliably communicate data to operations node communicator 56 on first set of frequency channels. It is to be noted that sensors 55 are high priority sensors and are required for operation. A similar problem can occur if node communicators 56 interfere with sensors 65 on second frequency channel set. In this invention the power levels of all node communicators 56 and 66 on the first and second sets of frequency channels to lowest possible setting to better enable the battery powered sensors to broadcast their data messages with minimal interference. Higher power settings for wireless communications inherently increase the interference on adjacent frequencies so a lower power setting creates less interference. And for broadcast devices such as sensors in adjacent cells, keeping their power setting down actually reduces the interference from cell to cell. It is counterintuitive to turn down the broadcast power on devices that need to be heard, but by lowering the power settings on all devices reduces the mutual interference. The only issue is to design the cells in such a way that the most distant sensors 55 and 65 can still communicate.

In some prior arrangements, secondary sensors were arranged to transmit large bursts of analytics data, sometimes at high power. This can cause a high noise spiral where many sensors are ramping their signal strength to push their data through. In a high noise environment, these sensors are able to raise the power or signal strength and re-transmit the data until it is received. With recurring challenges to effectively communicate data over the interference of a high-power node communicator, the need to ramp up the power setting can result in fast battery drain and cause significant negative impact on adjacent wireless operations sensors 55 and adjacent cells. In this invention, the sensors 55 and 65 are configured to cap maximum transmit power. When a cell has suffered deteriorated wireless network quality, logic is programmed to detect this condition and report it for problem resolution.

A third aspect of the present invention provides a competitive advantage in communicating data gathered from across the refinery or industrial facility is the control of individual elements of refinery equipment and its optional wireless operation. For example, the control of something like the speed of a pump or a temperature setting or control over pressure in a vessel via wireless communication is quite challenging. Under current industry accepted practice, it requires a continuous signal from the operations center 50 to the final control element in the field. In this present invention control is divided into two elements. The first element is typically an operational setting such as a design pressure or design temperature. The second element is typically monitoring of the operation of the individual piece of equipment to determine whether the design setting is being maintained. Changing a design setting is not a time critical action in that fractions of a second generally do not lead to problems. Reacting to an excursion in performance compared to the design setting could very well be a time critical matter. So, controls that need to react quickly in nature are not transmitted wirelessly.

Figure 3:
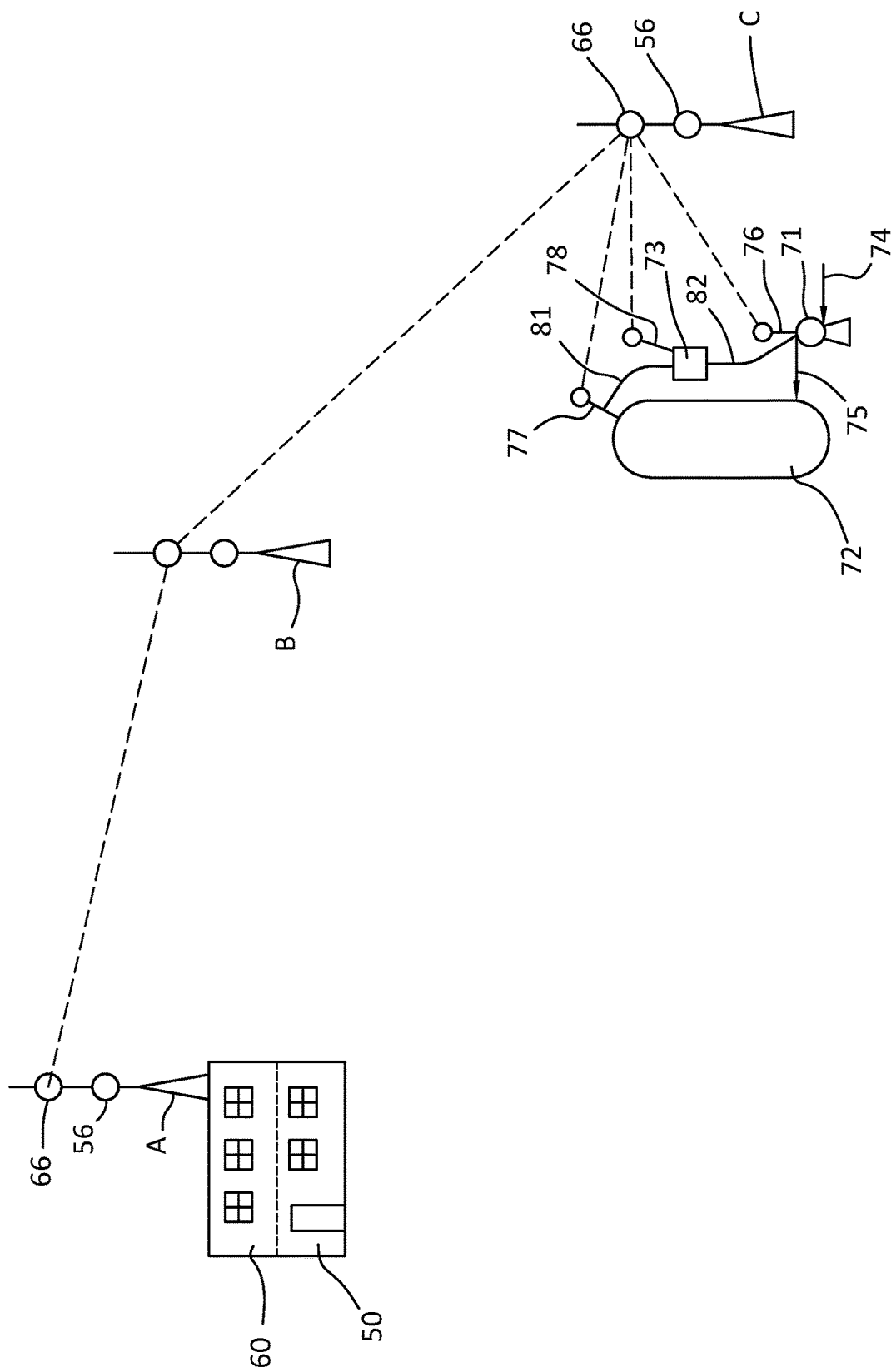
FIG. 3 is a diagram of a control scheme where a pump is controlled remotely via a wireless mode, but locally by direct connection.

Referring to FIG. 3, a system is shown where a pump 71 is arranged to direct fluid into a vessel 72 via a line 75 from a source line 74. A control element 73 controls the speed of the pump 71. Sensor 77 is arranged to sense pressure or volume or some other attribute in the vessel and report that information both to the operations center 50 and to the control element 73. The communication is optionally sent wirelessly back to the operations center and directly to the control element by wire 81. Sensor 78 is in communication with the operations center to update the operational target or set points for the pump. Essentially, if the operator wants the pump 71 to pump more fluid into the vessel 72, the control element 73 receives that directive from the operations center 50 directly through the sensor 78. A sensor 76 senses the actual operating rate of the pump and shares that with the control element directly via wire 82 and wirelessly and/or hardwired with the operations center 50. While wires are shown, the point is direct and uninterrupted communication between the sensed parameter and the control element. As in FIG. 1 (discussed in detail above), in one embodiment, at the center of each geographic cell or node on the mesh are preferably two node communicators. The first is the operations node communicator 56 arranged to be in two-way communication with the wireless operations sensors. The second is the secondary data node communicator 66. Preferably, the two node communicators 56 and 66 are stationed at an elevated location such as a tower, a pole or other stanchion. Sensors 76, 77, and 78 may be selectively wirelessly connected with either node 56 or node 66, depending on the importance of their data to the respective operators. In a more preferred arrangement, the two node communicators 56 and 66 are positioned on the same support structure and vertically separated thereon at that same geographic location as shown in FIGS. 1 and 2. These node communicators 56 and 66 are shown at various locations in FIG. 3 indicated by the letters A, B, C, D, and E and also in FIG. 2.

The control element is designed to continuously assess whether the equipment like pump 71 is performing in compliance with the design setting and if not, what is the immediate course of action. For example, if a temperature sensor on a pump detected that the pump was overheating, the control element may dictate in response to the temperature sensor to immediately slow down the pump by a set percentage in the design flow rate. It may be that the pump would be shut off, but in some arrangements, an immediate shut off is more problematic than slowing until the operations center can sort out why the pump is overheating. So, using a wireless communication to set and change design settings for the pump at some distance between the operations center when the operations center due to the limitations of human processing and reaction speed with at best be seconds, the delays of wireless communication are acceptable. However, the control element having nearly instant response times is ideally set up with direct connection using low cost and relatively short wires to connect the equipment to the safety override systems to steer operation to a most immediately safe setting. This arrangement provides wireless control and cost effectiveness but the safety and security of hard wiring for safety and security. So, according to the present invention, the operator's actions and setting of control parameters does not require continuous communication and monitoring although the equipment is being continuously monitored nearby. It is acceptable for operator actions and setting of control parameters to be slow in nature. This arrangement tolerates wireless latency or delays and non-continuous update rates or refresh rates. The continuous monitoring and control can include both human and machine-based decisions for control parameters, setpoints, cascade control and advanced process control. It is to be understood, with this arrangement, operators stay in the operations center for safety considerations and to have overall view of the operation, which is the main purpose of the operations center. Only fast acting controllers are moved to the field, to save the cost of wiring to and from the control center. This arrangement is especially valuable since most control problems, if not all, can be divided into the two aspects described above.

In closing, it should be noted that the discussion of any reference is not an admission that it is prior art to the present invention, especially any reference that may have a publication date after the priority date of this application. At the same time, each and every claim below is hereby incorporated into this detailed description or specification as an additional embodiment of the present invention.

Although the systems and processes described herein have been described in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. It is the intent of the inventors that variations and equivalents of the invention are within the scope of the claims while the description, abstract and drawings are not to be used to limit the scope of the invention. The invention is specifically intended to be as broad as the claims below and their equivalents.

The invention claimed is:
1. A process for communicating data within an industrial setting including a central operations location and secondary data center, where the process comprises:
   installing at least two groups of wireless sensors in an industrial setting,
      wherein each group of wireless sensors contains at least one wireless sensor,
      wherein at least one group of wireless sensors is assigned a first specific set of frequency channels for wireless communication, wherein at least one group of wireless sensors is assigned a second specific set of frequency channels for wireless communication that is different from the first specific set of frequency channels, installing at least two groups of node communicators in the industrial setting corresponding to the number of groups of wireless sensors, wherein at least a first group of node communicators contains one or more node communicators and is arranged to communicate with the group of wireless sensors assigned to the first specific set of frequency channels for wireless communications, wherein at least a second group of node communicators contains one or more node communicators and is arranged to communicate with the group of wireless sensors assigned to the second specific set of frequency channels for wireless communications, setting the power for each wireless sensor to a maximum signal strength to reduce interference with other wireless sensors.

2. The process according to claim 1 wherein the at least one group of wireless sensors is assigned a first specific set of frequency channels for wireless communication based on operational priority of the information it senses and wherein the at least one group of wireless sensors is assigned a second specific set of frequency channels for wireless communication based on operational priority of the information it senses.

3. The process according to claim 1 wherein the at least one group of wireless sensors is assigned a first specific set of frequency channels for wireless communication based on noise or interference optimization and wherein the at least one group of wireless sensors is assigned a second specific set of frequency channels for wireless communication based on noise or interference optimization.

4. The process according to claim 1 wherein the at least one group of wireless sensors is assigned a first specific set of frequency channels for wireless communication based on desirable update rate and wherein the at least one group of wireless sensors is assigned a second specific set of frequency channels for wireless communication based on desirable update rate.

5. The process according to claim 1 wherein the at least one group of wireless sensors is assigned a first specific set of frequency channels for wireless communication based on one or more of operational priority of information, noise or interference optimization, or update rate considerations and wherein the at least one group of wireless sensors is assigned a second specific set of frequency channels for wireless communication based on one or more of operational priority of information, noise or interference optimization, or update rate considerations.

6. The process according to claim 5 wherein the step of installing at least two groups of node communicators in the industrial setting corresponding to the number of groups of wireless sensors further comprises installing at least one of the node communicators for each group arranged to forward data wirelessly over a backhaul communications set of frequency channels that does not interfere with the first specific set of frequency channels and the second specific set of frequency channels.

7. The process according to claim 6 wherein the power for each wireless sensor is set at a maximum of +12 dbm signal strength.

8. The process according to claim 6 wherein the power for each wireless sensor is set at a maximum of +10 dbm signal strength.

9. The process according to claim 6 wherein the power for each wireless sensor is set at a maximum of +8 dbm signal strength.

* * * * *